United States Patent [19]

Crane et al.

[11] Patent Number: 4,854,717

[45] Date of Patent: Aug. 8, 1989

[54] FOOD MIXER/FOLDER

[75] Inventors: Herbert R. Crane, Troy, Ohio; Margaret G. Liddell, Orlando, Fla.

[73] Assignee: Hobart Corporation, Troy, Ohio

[21] Appl. No.: 142,157

[22] Filed: Jan. 11, 1988

[51] Int. Cl.[4] .......................... B01F 7/04; A47J 43/07

[52] U.S. Cl. ...................................... 366/197; 366/309

[58] Field of Search .................................. 366/97-100, 366/197-201, 207-209, 213, 218, 241-254, 272, 279, 281-284, 291, 309, 331; 99/348

[56] References Cited

U.S. PATENT DOCUMENTS

| | | | |
|---|---|---|---|
| 485,822 | 11/1892 | Prescott | 366/197 |
| 500,656 | 7/1893 | Hall | 366/98 |
| 683,474 | 10/1901 | Mackinzie | 366/309 |
| 735,353 | 8/1903 | Eifeet | 366/197 |
| 741,586 | 10/1903 | Maurer | 366/309 |
| 789,614 | 5/1905 | Koelner | 366/98 |
| 1,049,600 | 1/1913 | Rambeaud | 366/98 |
| 1,123,933 | 1/1915 | Savage et al. | 366/331 |
| 1,142,461 | 6/1915 | Roth | 366/99 |
| 1,374,765 | 4/1921 | Owen | 366/99 |
| 1,571,655 | 2/1926 | Trust et al. | 366/197 |
| 1,827,608 | 10/1931 | Pickard | 366/197 |
| 2,014,734 | 9/1935 | Hoe | 366/197 |
| 2,251,903 | 8/1941 | Anstice et al. | 366/197 |
| 2,269,301 | 1/1942 | Anstice | 366/98 |
| 2,295,136 | 9/1942 | Stiers | 366/98 |
| 2,483,280 | 9/1949 | Hansen | 366/331 |
| 2,611,588 | 9/1952 | Kelley et al. | 366/197 |

FOREIGN PATENT DOCUMENTS

| | | | |
|---|---|---|---|
| 287262 | 2/1913 | Fed. Rep. of Germany | 366/97 |
| 1457346 | 12/1970 | Fed. Rep. of Germany | 366/309 |
| 1387695 | 3/1975 | United Kingdom | 366/247 |

*Primary Examiner*—Harvey C. Hornsby
*Assistant Examiner*—Joseph S. Machuga

[57] ABSTRACT

A hand-operated foom mixing/folding device for doughs, sauces, mousse or the like incorporates a rounded or contoured bottom bowl provided with a mount which removably supports the bowl on a conventional kitchen counter or table, the axis of the bowl extending at an angle of approximately 45° to vertical. A mixer arm is mounted for rotation around the axis of the bowl, and has a driving connection to a hand crank supported by the mount. Preferably the mount includes a vertically extending post fitted with a clamp mechanism at its lower end which can grip the edge of a table or countertop and support the bowl in the aforementioned orientation. The mixer arm has a contoured lifting/folding surface with a leading edge (preferably flexible) closely following the sidewall contour of the bowl, and a knife edge on an opposite part of said arm from the folding surface. The knife edge acts to cut through the material(s) in the bowl and gently mix with a smearing action as the materials are further mixed and blended. The arrangement is such that a user can rotate the crank at a desired slow speed while looking directly into the bowl and observing the mixing and folding action and the condition and/or consistency of the mix being prepared.

3 Claims, 3 Drawing Sheets

FOOD MIXER/FOLDER

BACKGROUND OF THE INVENTION

This application relates to a mixing and folding apparatus, preferably hand driven, and particularly for use in commercial kitchens, for prepartion of various batters, particularly biscuit mixes, food mixes as for souffles, sponge cakes, or mousse.

Foods of this class, items which require the careful mixing together of dry powder-like substance with liquids such as milk, cream, beaten egge white or similar frothy liquids, are not readily prepared in a power driven mixer. Mixing them for too long a period, or at too high a speed, or combinations of such excesses, will result in tough biscuits when baked, or in souffles or mousse which are too thick or flat and have lost the needed "froth" from whiped cream, beaten separated egg whites, or the like. Thus it is often best to utilize a relatively slow-moving beating and/or folding arm, many times a flexible spatula or blade held in the hand or simply the hand itself, which gently lifts and mixes and combines materals placed in a bowl by movng the materials from the bottom of the bowl and depositing them on top of the materials with no strong beating action.

Hand operation gives the chef close control over this action, but to perform this operation in commercial quantities it is necessary to have mixing bowls of a capacity which is greater than can readily be handled with a hand-held spoon, spatula, other tool or the hand itself. As commercial kitchen equipment becomes more and more mechanized, and in the case of fast-food establishments inexperienced part-time help is employed to perform these takss, it has appeared that certain preparation operations, such as the mixing of certain biscuit doughs, the blending of mousse, and the preparation of various sauces, cannot be achieved with good results using standard power-driven food mixers. Such mixers cannot provide the proper mixing action and even if they could, the lowest blending speed available may be too fast for these operations, or it may be difficult to minimize the time of mixing when suing such equipment.

On the other hand, it is necessary to prepare these types of food products in quantities that would require several repetitious uses of a hand mixing bowl and require considerably more time than would be desired, besides some of these more delicate mixes can deteriorate if left to set for any length of time while additional quantities are being prepared.

There is also a class of food preparation devices, known in the trade as cutter-mixers, which employ a tapered symmetrical bowl having a high speed (3600 rev./min.) cutter blade which is mounted directly to a motor shaft entering through the bottom center of the bowl. A typical such device is disclosed in U.S. Pat. No. 4,101,977 issued July 18, 1978. These devices are designed to prepare very quickly large quantities of a wide variety of food products, for example fresh salad mix, meats or vegetables to be finely chopped and mixed, or some doughs.

The blades in these devices are so constructed and driven as to induce a flow of food product in a generally annular path which progresses outward from the blades, upward along the bottom and side of the bowl, then inward and downward as the product loses velocity, returning to the blades. These devices are often equipped with a hand operated mixing baffle which is mounted from a crank at the center of the lid for the bowl, and such baffle extends partially down along the side of such bowl as shown in the above-mentioned U.S. patent. The purpose of this baffle is to remove food product tending to cling to the bowl wall and direct such food product back into the aforementioned annular path. By their very nature, these devices only operate with the bowl axis vertical, although the bowl is often mounted for tilting movement, particularly for unloading of completed product. Further, such mixers are inappropriate for foods of the class which are to be processed by the food mixer/folder of the present application.

SUMMARY OF THE INVENTION

The present invention provides a hand operated mixing and/or folding device for certain doughs, sauces, and mousse, in which there is a bowl having a rounded or contoured bottom of substantial capacity, for example 20 quarts (18.927 liters), provided with a mount which supports the bowl on a conventional kitchen counter or table, with the axs (through the center of the bowl and its bottom) extending at an angle of approximately 45° with respect to vertical. A mixer arm is mounted for rotation around the axis of the bowl, and has a driving connection to a hand crank supported by the mount and rotatable about a generally horizontal axis. Preferably the mount includes a vertically extending post fitted with a clamp mechanism at its lower end that can grip the edge of a table or countertop and support the post extending vertically upward. The post has a bracket with an arcuate arm that matches the curvature of a sector of the bowl rim, and a clamp is provided to hold a portion of the rim into this arm, thereby supporting the bowl in the above described orientation. The mixer arm preferably has a contoured lifting/folding surface with a flexible leading edge closely following the side wall contour of the bowl, and the entire arrangement is such that a user can rotate the crank at a desired slow speed while looking directly into the bowl and observing the mixing and folding action, and the condition and/or consistency of the mix being prepared. A blade may be provided on the mixer arm, about opposite the mixing/folding device, for cutting the mixture and gently mixing wth a "smearing" action. In an alternate embodiment, the folding device is provided with a number of separator plates, extending approximately perpendicular from the surface of the folding device toward the center of the bowl, and serving to prevent the mix from sliding axially along the surface of the blade as the folding device is moved around the interior surface of the bowl.

Thus, the mixing/folding device simulates and in fact improves on hand-mixing using a large bowl and a mxing spatula held in one hand. The action is a combination of (a) lifting the mix upward from the tilted side and bottom of the bowl and (b) separating and combining the mix, thereby producing the effect of a gentle orbital-type tumbling mixing action.

The primary object of the invention, therefore, is to provide a mixing and/or folding device, preferably for foods in which a bowl can be supported at a predetermined angle to a counter or table, and a crank operated mixing arm rotated in the bowl, with a lifting/folding surface on the arm having a flexible edge which folows the inner contour of the bowl and gently moves the food materials generally upward away from the bowl wall and toward its center; to provide such a device with a separating knife which cooperates with the mixing/folding device; to provide such a mixing/folding device in which the bowl is supported on a post which includes the hand drive mechanism, and which can be readily mounted or dismounted at the edge of a table or countertop.

Other objects and advantages of the invention will be apparent from the following description, the accompanying drawings and the appended claims.

DESCRIPTION OF PREFERRED EMBODIMENT

Figure 1:
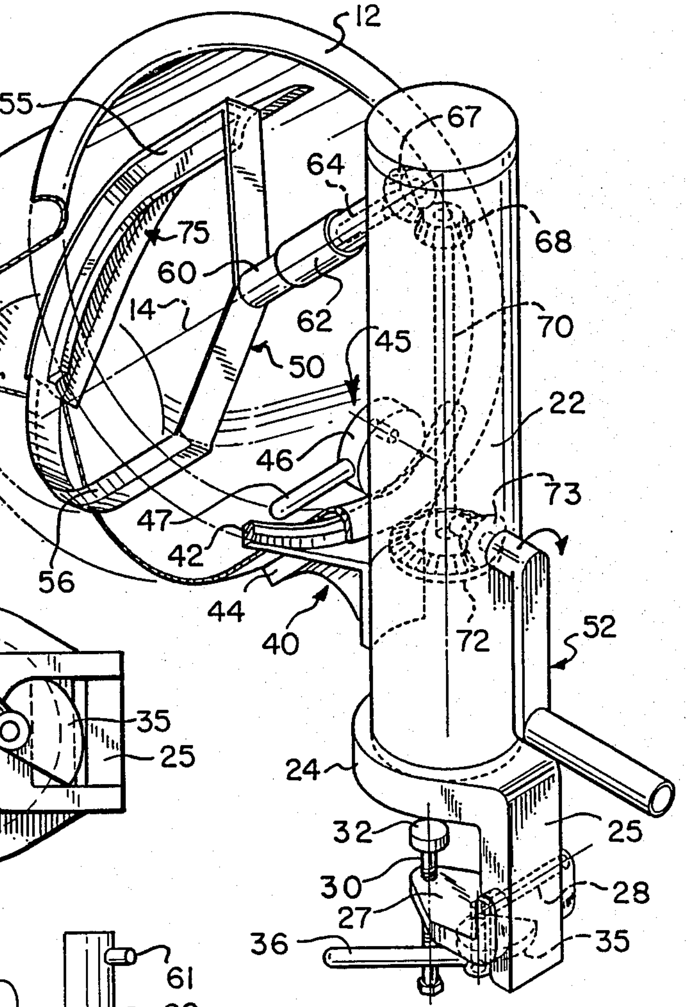
FIG. 1 is a perspective view f a hand-operated food mixer as provided by the invention.

Referring to the drawings, the invention is embodied in a hand powered mixing device including a round bottom bowl 10 of substantial capacity, for example 20 quarts (18.927 liters), which is typically 12.5 inches in diameter at its rim 12 and has a depth of 11.5 inches along its vertical center line or axis 14. The bowl at its bottom 15 has a generally semispherical shape merging into an essentially flat central portion 16.

A mount structure supports bowl 10 on a conventional kitchen counter or table. This mount structure includes a hollow post 22 provided with a support ring 24 secured to its bottom end, and having a depending clamp arm 25. A clamp bracket 27 is hinged to arm 25 by a pin 28, and a clamping rod 30 is threaded into bracket 27, so as to extend upward generally along the vertical axis of post 22 when the parts are positioned as shown in FIG. 1. The head or pad 32 at the upper end of threaded rod 30 provides sufficient area for clamping pressure against the underside of the mounting surface.

Figure 7:
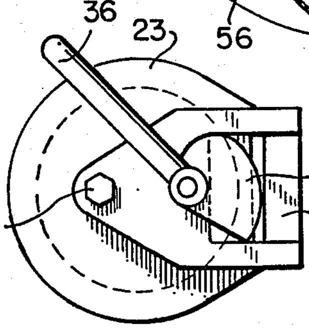
FIG. 7 is a detail bottom view of a mechanism for clamping the mixer unit to a table top.
Figure 2:
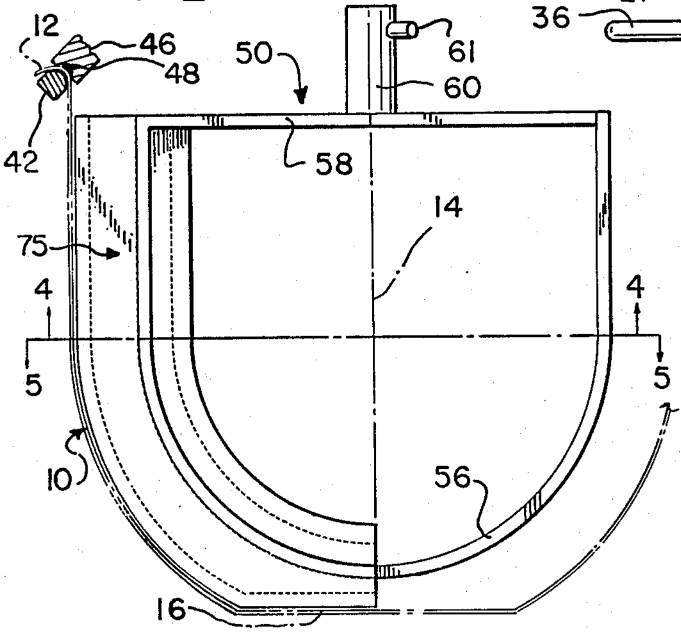
FIG. 2 is a cross-sectional view of the bowl with the mixer arm shown in elevation, the view being on a vertical axis rther than the operating angle as shown in FIG. 1.
Figure 3:
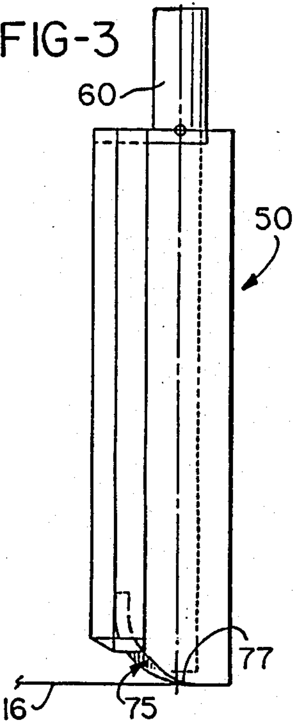
FIG. 3 is a side view of the arm itself.
Figure 9:
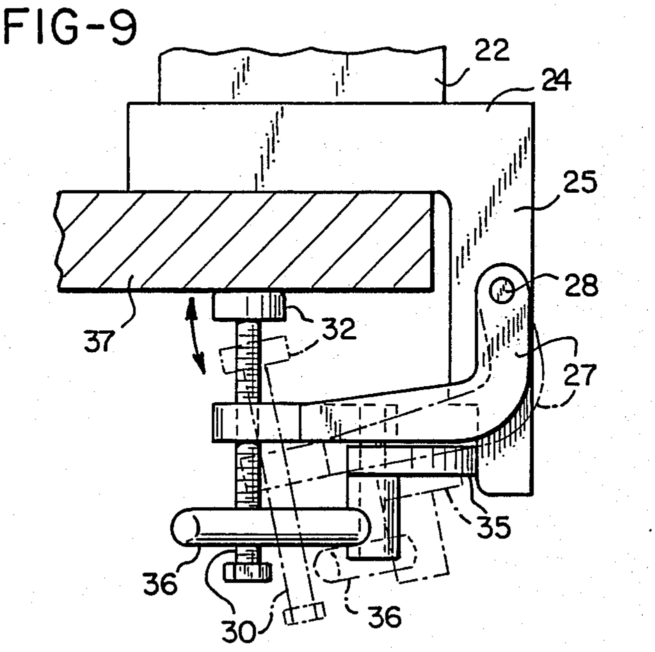
FIG. 9 is a side view of the base of the mixer showing the pivotal movement of the quick release/connect clamp used to support the mixer for use.

A locking cam 35 is pivotally mounted on the underside of bracket 27, and has an arm 36 with which the cam 35 can be urged against the clamp arm 25 to lock the clamp mechanism. Thus, once the spacing of the pad 32 and the underside of support ring 24 has been determind, the unit can be quickly mounted and dismounted from a table top or countertop 37, simply using a tightening or loosening motion of cam 35 by rotating its arm 36, see also FIGS. 7 and 9.

On the opposite side of post 22 from clamp arm 25, located about midway up post 22, there is a bowl supporting bracket or horn 40 which includes an arcuate arm 42 extending in opposite directions sideways from the post 22, and having a radius of curvature which matches the exterior of bowl 10 just below rim 12. Also, a lower support arm 44 extends downwardly from bracket 40, and is contoured to fit against the side of bowl 10, as seen in FIG. 1. The angle of arm 44 is such that a bowl rested and supported on bracket 40 will have its vertical centerline 14 located approximately at 45° with respect to vertical. Experience has shown that this angle can be varied somewhat, although any change in this angle is best kept within plus or minus 7°. A clamping device 45 acts to hold the rim 12 against arm 42, and to release the bowl for emptying or for cleaning. In the embodiment shown, the clamping device comprises a cam 46 pivotaly supported on post 22, and rotatable by an arm 47 to exert clamping pressure on the rim 12, pressing it against arm 42. Cam 46 has formed in at least a part of its outer surface, a contoured groove 48 which is designed to fit the shape of bowl rim 12 where such rim merges into the body of the bowl.

A mixer arm 50 is mounted for rotation along the axis 14 of bowl 10, ad (as later described) has a driving connection to a hand crank 52 supported by post 22. Mixer arm 50 is of a general U-shape, with the blade 55 of the arm contoured as shown to provide an edge 56 that will be easier to move through the type of mixture for which this device is intended. The top ends of blade 55 are joined by cross arms 58, which are in turn fixed to the arm shaft 60, and that shaft terminates in a coupling part including a typical cross-pin 61 to interengage with a conventional notched sleeve coupling 62.

A drive shaft 64, rotatably supported on the upper end of post 22 by an angled bracket (not shown), is fixed at one end to coupling 62, and at its other end extends into the upper end of post 22, where it is attached to a 45° bevel driven gear 67. That gear mates with a bevel drive gear 68 carried on the top of a vertical drive shaft 70, which is rotatably supported within post 22. The supporting bearings have been omitted from the drawing for simplification of illustration. At the lower end of shaft 70 there is attached a 90° bevel drive gear, which in turn is engaged and rotated by a bevel drive gear 73 fixed to the end of hand crank 52. The axis of rotation of the hand crank is preferably horizontal, as shown. Thus appropriate rotation of hand crank 52 will result in rotation of mixer arm 50. Although various ratios are possible, a reduction ratio of about 2:1 (at gears 72,73) has been found suitable to provide the desired speed and torque combination for rotating mixer arm 50.

The mixer arm has a contoured lifting/folding device 75 attached to one side of blade 55, including a surface 76 which is inwardly curved toward the axis 14 of the bowl, and a leading edge 77 closely following the cross-sectional shape or contour of bowl 10. This contoured device 75, or even the entire mixing arm 50, is constructed of a suitable molded plastic material, such a polypropylene, which has a small degree of flexiblity in its thin cross-sections, particularly at the spatula-like edge 77.

Figure 4:
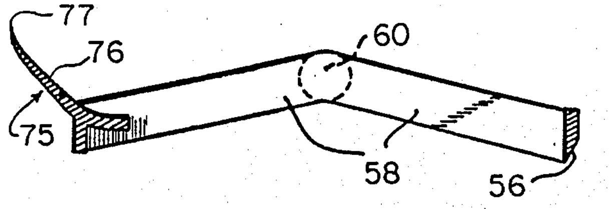
FIG. 4 is a cross-sectional view taken on line 4—4 of FIG. 2.
Figure 5:
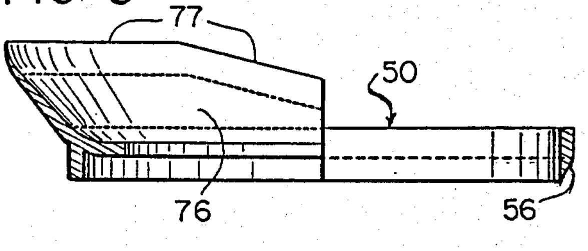
FIG. 5 is a cross-sectional view taken on line 5—5 of FIG. 2.
Figure 6:
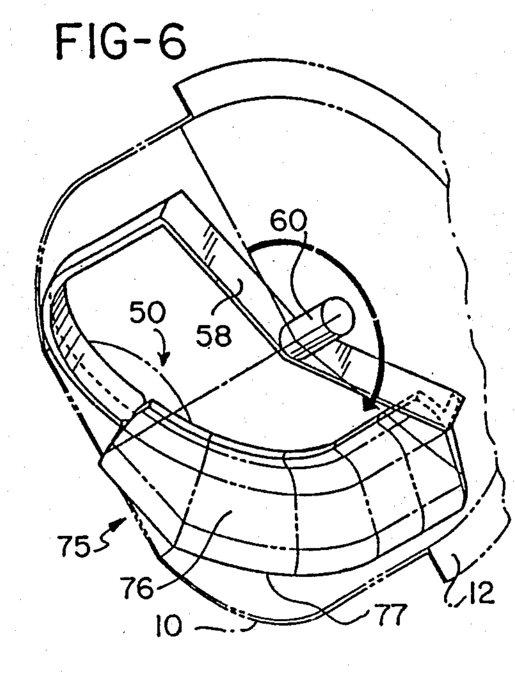
FIG. 6 is a perspective view of the bowl and mixer arm as seen from the position of a user, showing the cooperative relation between the folding surface on the mixer arm and the interior of the bowl.

Referring to FIGS. 1 and 4, the user can rotate crank 52 counterclockwise (as viewed endwise of the hand crank) and this will rotate arm 55 clockwise (as viewed looking downward along the arm 55), and the device 75 will lift the mix resting along the bottom and side of bowl 10, and turn the mix generally inward of the bowl, upward and upon itself, causing a thorough but gentle mixing of the material(s) in bowl 10. The knife edge 56, which is separated a considerable distance from the bowl surface, cuts through the material(s) and gently mixes with a "smearing" action and promotes further mixing upon the next pass of device 75. This occurs at a desired slow speed, and the user can look directly into the bowl and observe the action of the mixing arm, and the condition and or consistency of the mix being prepared.

Figure 8:
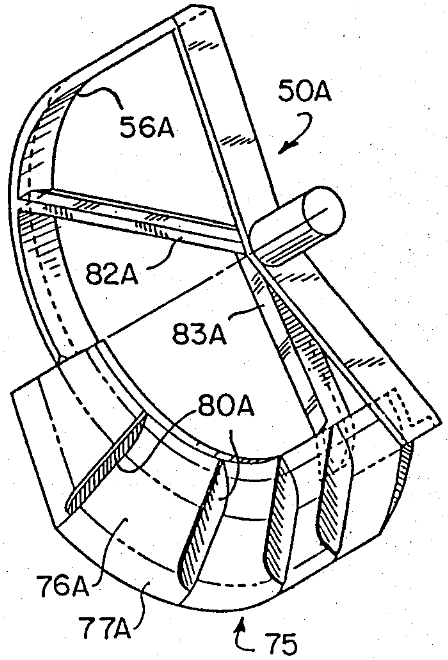
FIG. 8 is a view of a modified form of mixing arm.

FIG. 8. shows a modified form of arm 50A and a modified lifting/folding device 75A on the arm 50A. This form has been found suitable for use with some thicker biscuit doughs, and is extended in length and fitted with a plurality of plates 80A which tend to prevent the mix from sliding axially along the surface of the blade and to separate the mix into a number of segments as the device passes under the mix. Also, in addition to the edged blade 56A, additional edged blades or arms 82A and 83A are provided to further separate the mix during rotation of arm 50A.

Even though the illustrated hand driven mixer is the preferred form of the present invention, in some applications it may be desirable to operate the mixer with a slow-speed motor drive (a small gear-motor or the like). If such a motor drive is utilized, it may be controlled by an RPM counter to "program" a selected number of revolutions to ensure no over-mixing occurs.

While the form of apparatus herein described constitutes a preferred embodiment of this invention, it is to be understood that the invention is not limited to this precise form of appartus, and that changes may be made therein without departing from the scope of the invention which is defined in the appended claims.

What is claimed is:

1. A mixing device for food prepration comprising a post, means supporting said post on a generally vertical axis, a mixing bowl having means defining a central axis and a cylindrical side, a generally open top, and a rounded bottom formed symmetrically about said axis extending through said open top, means supporting said bowl from said post with said bowl axis located along a line which extends downward and away from said post, a mixing arm rotatably supported within said bowl and a mixer shaft extending along said bowl axis from said arm upward toward said post, a crank supported on said post and connected to rotate said shaft, a spatula-like folding member on said arm and having an edge conforming to and following the inner contour of said bowl and extending in the forward direction of rotation of said shaft, and a knife edge on said arm located on the opposite side of said arm from said folding member spaced inwardly from said side of said bowl and facing the direction of rotation of said folding member so as to cut through the material in the bowl and gently mix with a smearing action as the materials are further mixed and blended.

2. A mixing device as defined in claim 1, wherein at least the edge of said folding member is flexible and is mounted to scrape the inner surface of said bowl.

3. A mising device as defined in claim 1, further including a rim extending outward from said open top of said bowl, said bowl supporting means including a bracket extending from said post and having an arcuate portion corresponding to the shape of a sector of said rim, and clamp means cooperating with said bracket to hold a portion of said rim on said arcuate portion of said bracket.

* * * * *